United States Patent [19]
Nilsson

[11] 4,455,000
[45] Jun. 19, 1984

[54] TAKE-UP MECHANISM FOR SAFETY BELTS

[75] Inventor: Karl E. Nilsson, Ottobrunn, Fed. Rep. of Germany

[73] Assignee: Bayern-Chemie Gesellschaft für Flugchemische Antriebe mit beschränkter Haftung, Fed. Rep. of Germany

[21] Appl. No.: 489,003

[22] Filed: Apr. 27, 1983

[30] Foreign Application Priority Data

Apr. 29, 1982 [DE] Fed. Rep. of Germany ....... 3215929

[51] Int. Cl.³ ............................................. A62B 35/02
[52] U.S. Cl. .............................. 242/107.4 A; 242/107; 242/107.4 B
[58] Field of Search ................. 242/107.4 A, 107.4 B, 242/107.4 R, 107; 280/806; 297/478, 480

[56] References Cited

U.S. PATENT DOCUMENTS

| | | | |
|---|---|---|---|
| 4,014,479 | 3/1977 | Nilsson et al. | 242/107.4 A X |
| 4,053,119 | 10/1977 | Doin et al. | 242/107.4 A X |
| 4,056,242 | 11/1977 | Herrmann | 242/107.4 A X |
| 4,151,967 | 5/1979 | Lindblad | 242/107.4 R |
| 4,372,501 | 2/1983 | Inukai | 242/107.4 A X |

*Primary Examiner*—John M. Jillions
*Attorney, Agent, or Firm*—McGlew and Tuttle

[57] ABSTRACT

A take-up mechanism for the seat belt of a vehicle comprises an automatic belt winding assembly having a reel with a reel shaft for dispensing and rewinding the belt. A pull-up assembly for rewinding a belt of the winding assembly includes a rotary piston motor drivable by pressurized gas, usually generated from a pyrotechnic charge, and a ring which is co-rotatably connected to a rotary vane of the motor. The ring is coupleable to the reel shaft of the automatic winding assembly by engagement of a blocking element with a notched wheel co-rotatably mounted to the reel shaft. A sensor element is engageable with the notched wheel upon abrupt movement of the vehicle to block rotation of the reel in the dispensing direction. A control disc is rotatable with respect to the notched wheel and is engaged with the blocking element for moving the blocking element to engage the notched wheel upon the occurrence of either an abrupt vehicle motion or when the belt is moved in the dispensing direction abruptly. A locking mechanism is provided for preventing rotation of the ring in the belt dispensing direction.

18 Claims, 9 Drawing Figures

TAKE-UP MECHANISM FOR SAFETY BELTS

FIELD AND BACKGROUND OF THE INVENTION

The present invention relates in general to vehicle safety or seat belts and in particular to a new and useful take-up mechanism for automatically and partially retracting a safety belt during a vehicle emergency.

Take-up mechanisms serve the purpose of taking up the slack in a seat or safety belt of a vehicle, upon the occurrence of an impact on the vehicle, by pulling up the belt and thus minimizing the amount by which a passenger will be hurled forward, until the belt becomes effective. To obtain a satisfactory take-up, the belt must be retracted by about 20 cm. This corresponds to an angle of rotation of the belt reel in an automatic belt winding unit of about 550°.

A take-up mechanism is known from German AS No. 25 10 514, wherein two axially juxtaposed rotary vanes are provided on a piston shaft of a rotary piston motor, with a wing fixed to a housing of the mechanism and being associated with the first vane which forms a first expansion chamber with the wing. The second rotary vane is associated in a second expansion chamber with a rotary wing which is secured to a rotary cylinder and a ring at the belt reel side of the mechanism. To couple the ring to the belt reel, a plurality of bores is provided at the periphery of the adjacent side disc of the reel, into which a bolt is engageable which is drivable by the expanding gases of a drive charge (ignited upon abnormal vehicle motion due to an impact) and is provided on the ring at the belt reel side which is firmly connected to the rotary wing of the second expansion chamber. A notched wheel for a vehicle-controlled blocking of the automatic belt winding unit (operating upon abrupt but normal motion of the vehicle) is formed by the side disc facing the piston motor of the belt reel. The engaging sensor element for the notched wheel is designed as a small pawl for lifting a large pawl to be engaged with the notched wheel. The gases penetrating into the two expansion chambers turn the vane of the rotary piston shaft cooperating with the wing fixed to the housing, and also the second vane cooperating with the wing fixed to the ring. At the same time, the expansion space between the second vane and the wing secured to the ring enlarges, so that this wing produces almost two revolutions of the belt reel.

Disadvantageous in the prior art design is the relatively complicated construction of a rotary piston motor comprising two adjacent expansion spaces, the absence of a belt-controlled blocking mechanism (for blocking the belt when it is pulled abruptly, and the fact that the locking members must be massive casings in order to exhibit a satisfactory rigidity.

SUMMARY OF THE INVENTION

The present invention relates to a take-up mechanism for a safety or seat belt in a vehicle which includes vehicle sensitive blocking means for blocking the belt reel upon abrupt but normal vehicle motion, belt sensitive blocking means for blocking rotation of the reel when the belt is pulled abruptly and take-up means for retracting a length of the belt upon the occurrence of a violent motion due for example to an impact on the vehicle.

The invention solves the problem of providing a take-up mechanism of the above mentioned kind, by employing a simply designed rotary piston motor, requiring only a small number of component parts, thus being easy to assemble, capable of accommodating without problems a belt controlled blocking mechanism, and permitting the design of locking members as stampings.

Accordingly, an object of the present invention is to provide a take-up mechanism for a safety belt of a vehicle, which mechanism comprises a housing, a belt reel haing a co-rotatably connected reel shaft rotatably mounted to the housing in a belt take-up direction and an opposite belt extension direction, automatic belt winding means operatively connected to said reel for urging said reel to rotate in the take-up direction, a notched wheel co-rotatably connected to said reel shaft, a rotary piston motor having an abutment connected to said housing, a rotary vane rotatably mounted to the housing and defining a chamber with the abutment, and gas pressure means for pressurizing the chamber to rotate the rotary vane, which gas pressure means is activated upon the occurrence of an abrupt vehicle motion. A ring is co-rotatably connected to the rotary vane with vehicle sensitive blocking means including a stop element movable to engage with the notched wheel and stop rotation of the shaft in the belt extension direction upon the occurrence of an abrupt vehicle motion. A control disc is rotatably mounted to the housing and rotatable upon the occurrence of an abrupt vehicle motion or an abrupt motion of the reel and reel shaft in the extension direction, caused by a quick pulling of the belt. At least one blocking element in the form of a pawl or the like, is movably mounted on the ring and normally in a disengaged position with respect to the notched wheel. The blocking element is operatively engaged with the control disc for engaging the notched wheel upon motion of the control disc so that, upon an abrupt vehicle motion such as that caused by an accident, the gas pressure means are activated to cause engagement of the ring with the notched wheel over the blocking element so that the notched wheel is rotated with rotation of the ring, in the take-up direction to take-up any slack in the belt. Blocking means are connected between the housing and the ring for preventing rotation of the ring in the extension direction.

Another object of the invention is to provide such a take-up mechanism which includes belt blocking means for blocking rotation of the reel in the extension direction upon the occurrence of an abrupt motion of the reel in the extension direction, which is associated with the control disc.

A still further object of the invention is to provide a take-up mechanism for the safety belts of a vehicle which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the following, one embodiment of the invention is explained in more detail with reference to the drawings in which.

DESCRIPTION OF THE PREFERRED EMBODIMENT

Figure 1:
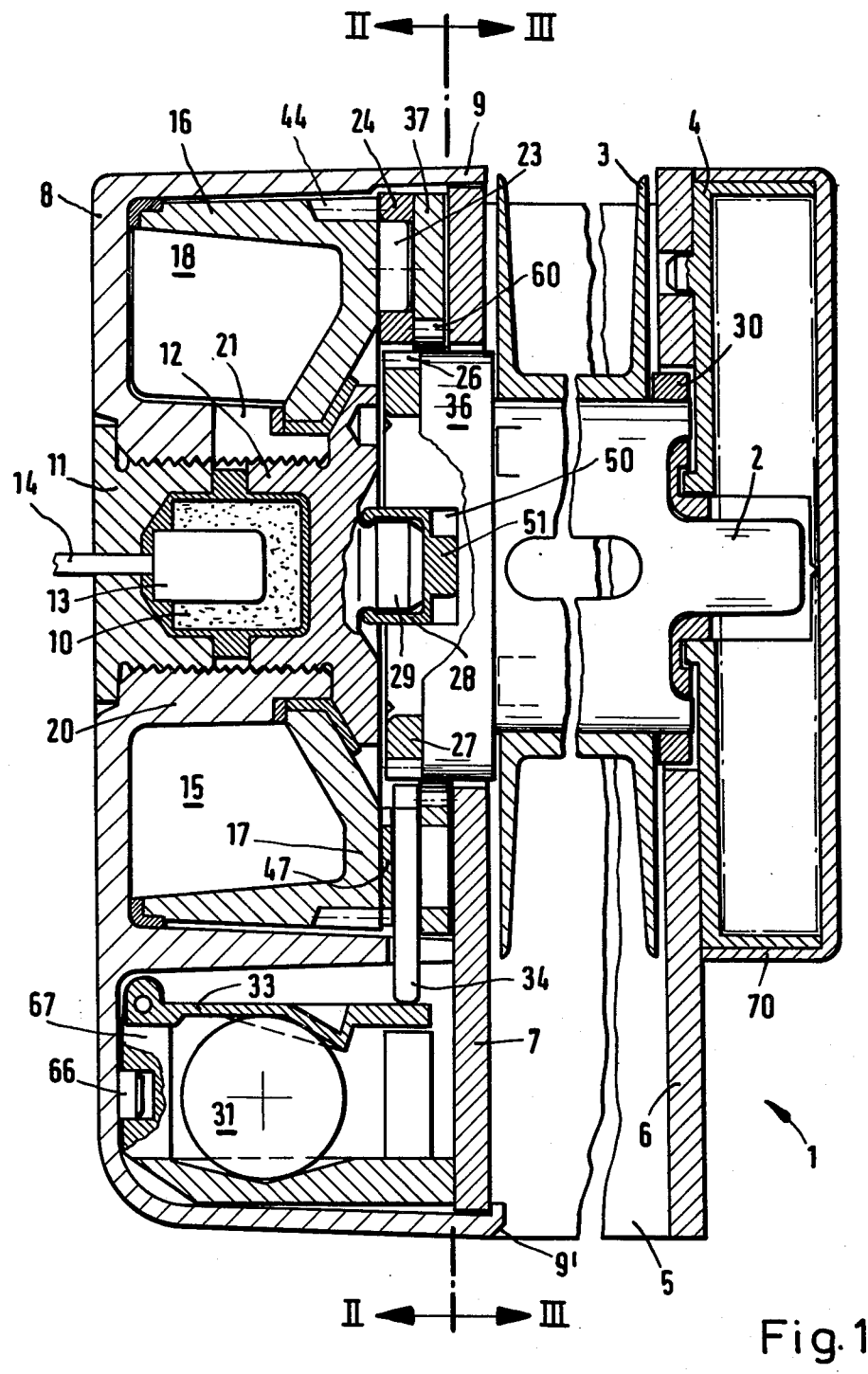
FIG. 1 is a longitudinal sectional view of a belt winding assembly with the belt reel shaft shown only partly.

According to FIG. 1, the take-up mechanism of the invention substantially comprises an automatic belt winding assembly 1 including a seat or safety belt reel 3 which is non-rotatably secured to a reel shaft 2, a winding spring (see FIG. 8) in a casing 4, and a housing having a back plate 5 and two plate-shaped legs 6 and 7 which project frontally therefrom. Casing 4 of the winding spring is secured to leg 6, and a casing 8 for accommodating the pull-off assembly is secured to leg 7.

Through connecting claws 9, pull-off casing 8 is positively and non-rotatably connected to plate-shaped leg 7 of the housing for the automatic belt-winding assembly 1. In the lower part of FIG. 1, a formed-on connecting claw 9' is shown through which casing 8 and leg 7 of the housing of assembly 1 are positively connected to each other in the axial direction.

In the center of casing 8, a pyrotechnical drive charge 10 is provided between a screw plug 11 and a screw plug 12. Charge 10 is ignitable by means of a fuse 13. An ignition cable 14 leads through plug 11 from fuse 13 to the outside.

Figure 9:
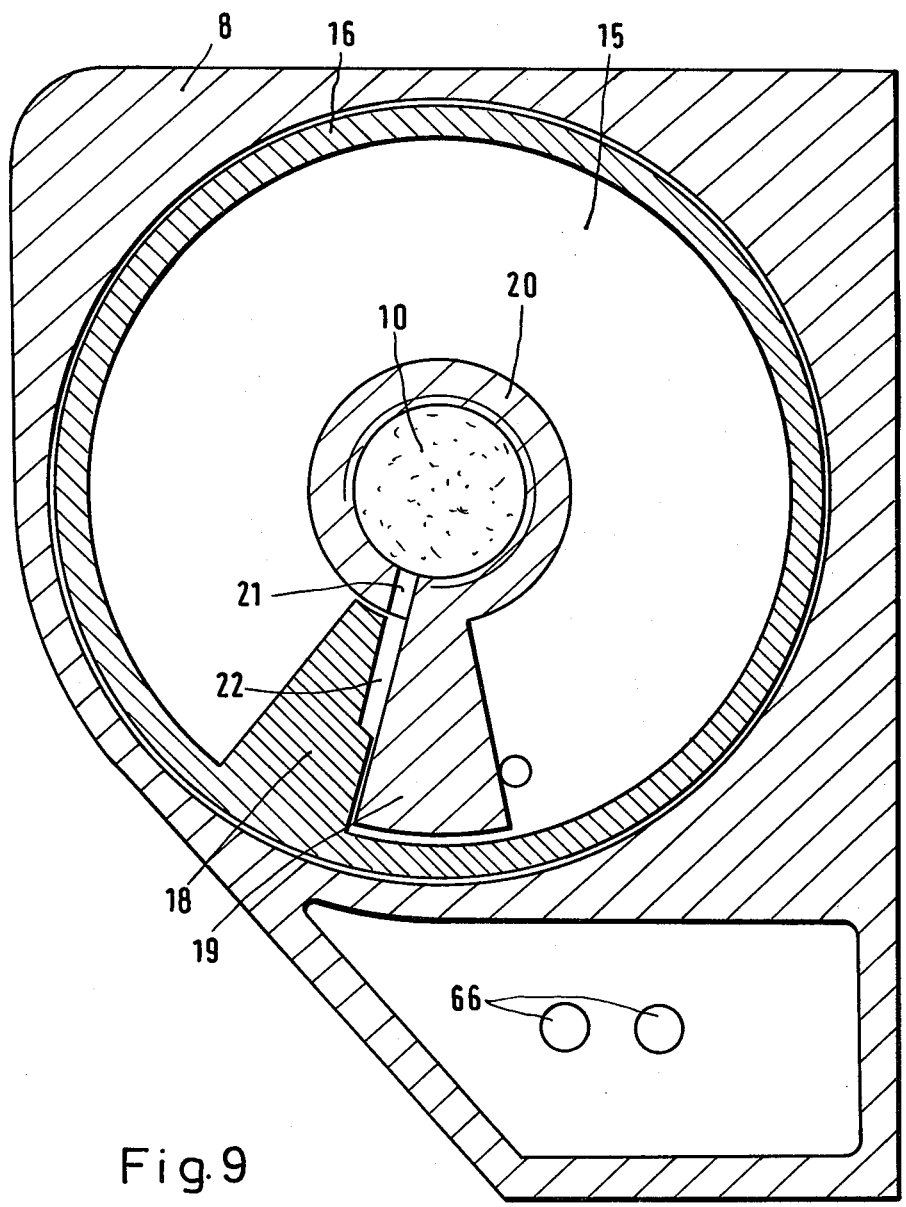
FIG. 9 is a sectional view taken along the line IX—IX of FIG. 1 with parts missing for clarity.

In an annular chamber 15, a rotary vane 18 is secured to a rotary housing comprising a cylinder 16 and a ring 17. Rotary vane 18 applies against an abutment 19 which is secured to a hollow hub 20 (see FIG. 9) fixed to the housing and accommodating the drive charge 10, the fuse 13, and the two screw plugs 11,12. The bore 21 extends through hub 20 from charge 10 to the expansion space 22 formed between rotary vane 18 and abutment 19. Upon igniting charge 10, the drive gases pass through bore 21 into expansion space 22, so that vane 18 is loaded and the housing comprising cylinder 16 and ring 17 is set in rotation.

Figure 2:
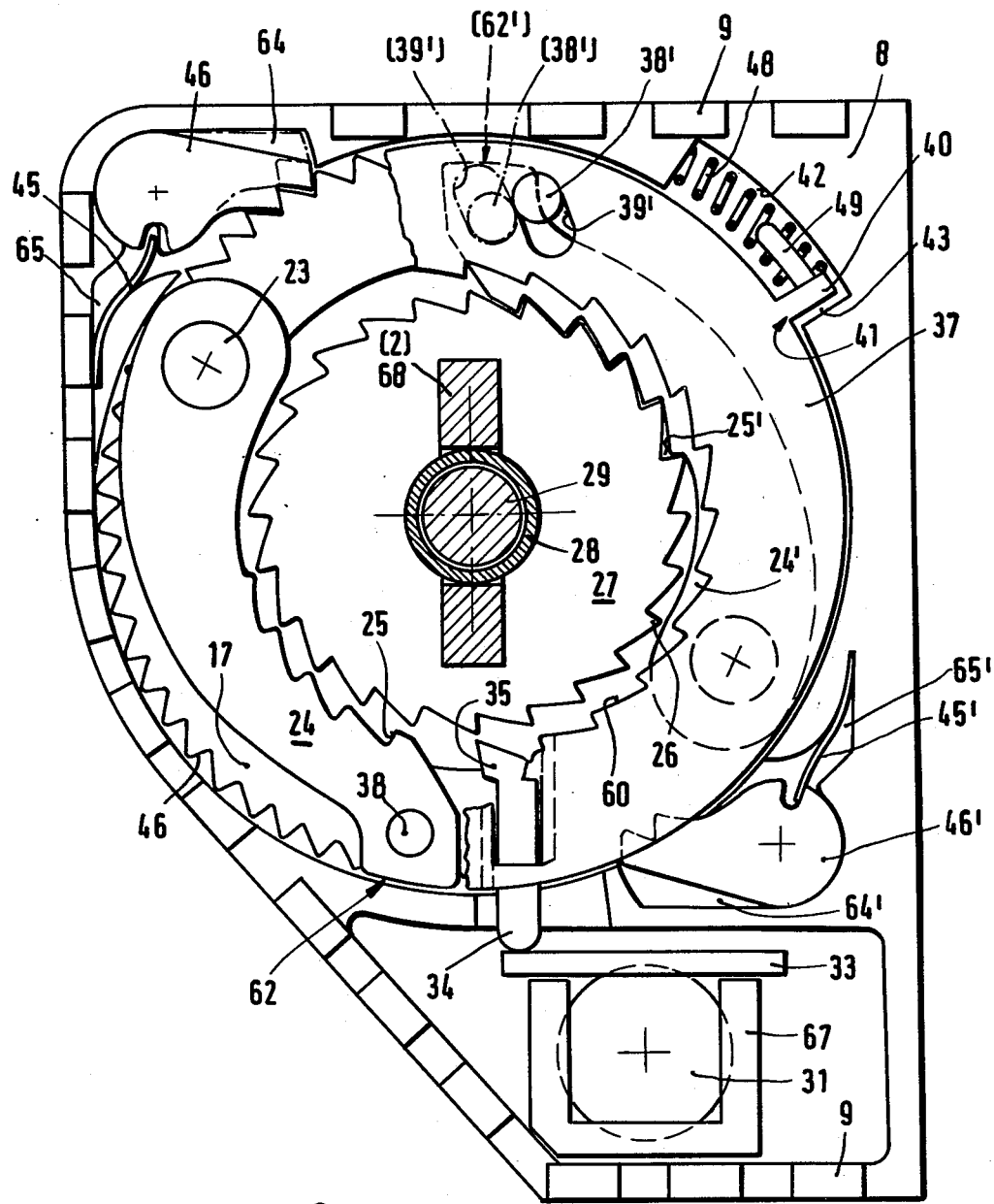
FIG. 2 is a view in the direction II—II of FIG. 1.

As shown in FIG. 2, ring 17 which is non-rotatably connected to vane 18 carries two pawls 24,24' pivoted on studs 23,23' and provided with teeth 25,25' which, as soon as charge 10 is ignited and ring 17 turns in the direction of belt retraction, engage conformable sawtooth-shaped teeth 26, of a notched wheel 27 which is positively connected to reel shaft 2.

Reel shaft 2 is mounted by means of a bearing sleeve 28 on a journal pin 29, and at the other side, in a bearing 30 supported in leg 6 of the housing. Journal pin 29 is provided on screw plug 12.

Normal blocking of the belt reel 3, so that it cannot rotate to release more belt, which is responsive to strong braking or curve negotiations for the vehicle (deceleration of 0.4 g only), is started by a sensor ball 31 which is thereby displaced from a rest position up an inclined plane 32, to lift a sensor level 33. Ball 31 with its associated parts thus form abrupt but normal vehicle motion sensitive means for blocking reel 3.

A belt sensitive blocking mechanism, which is actuated by a strong jerk at the belt, is accommodated in a capsule 36 shown in FIGS. 1 and 3, and to be described later.

According to FIG. 2, the two pawls 24,24' are mounted on ring 17 in diametral opposition. Paws 24,24' are engaged with a control disc 37 each through a guide pin 38,38', respectively, which are carried on pawls 24,24' and project into corresponding guide slots 39,39' of disc 37. Considered in the direction of the belt extension (counterclockwise in FIG. 2) the leading ends of guide slots 39,39' are located radially outside the trailing ends.

Only one half of control disc 37 in a rest position, is shown at the right hand side of FIG. 2, in order to better show the pawl at the left (also in a rest position). Pawl 24' at the right is shown in its engaged, blocking position, the corresponding position of guide pin 38' in guide slot 39' is shown in dash-dotted lines.

Control disc 37 carries a lug 40 with a predetermined break point 41. By means of a groove 42 in pull-out casing 8, a stop surface 43 for lug 40 is formed.

A locking device preventing ring 17 from turning in the direction of belt extension is formed by external teeth 44 and by two pawls 46, 46' which are pivoted to the housing and urged into engagement with teeth 44 by springs 45, 45'.

A pin 34 forming part of the motion or vehicle sensitive blocking mechanism is received for displacement in a guideway 47 of control disc 37. By means of a spring 48 extending in groove 42 of casing 8, and bearing against rod 40 of control disc 37, control disc 37 is loaded in the direction of belt retraction (clockwise in FIG. 2). Lug 40 carries a guide element 49 for spring 48.

Figure 3:
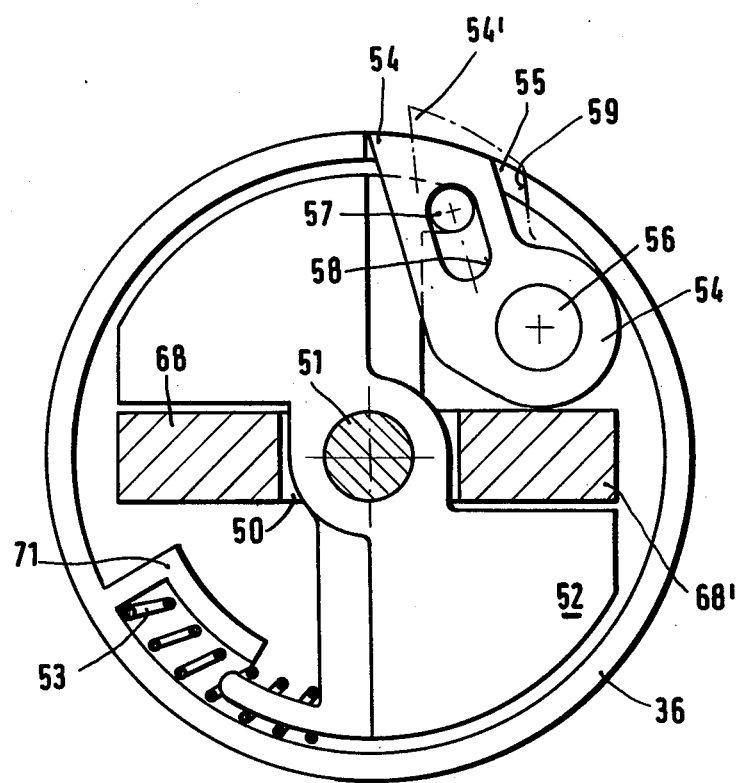
FIG. 3 is a view in the direction III—III of FIG. 1, but showing only the parts carried on the belt reel shaft.

According to FIGS. 1 and 3, a flywheel mass in the form of an inertia disc 52 is pivoted in a recess 50 of shaft 2, to bearing sleeve 28 through a journal or pin 51. Inertia disc 52 is held in its rest position by a spring 53 and is enclosed between notched wheel 27 and capsule 36 which has an aperture 55 in the zone of a detent lever 54. Detent lever 54 is mounted on a pivot pin 56 which is integral with capsule 36. The position of detent lever 54 is determined by a guide pin 57 carried on inertia disc 52, and by a guide slot 58 which is provided in detent lever 54 and into which guide pin 57 projects. Spring 53 is backed up by a guard 71.

Upon a jerky extension of the belt, reel shaft 2 as well as capsule 36 which is non-rotably secured thereto, and pivot pin 56 are set in rotary motion. Inertia disc 54 initially ramains in place, against the opposing force of spring 53, so that pivot pin 56 changes it position relative to guide pin 57, whereby detent lever 54 is moved into its position 54' shown in FIG. 3 and butts against stop surface 59.

The tip of detent lever 54 is thereby caused to protrude from aperture 55 of capsule 36 and engages with internal teeth 60 of control disc 37 (see FIG. 2). The strength of spring 53 is determinative for the threshold of actuation in the belt-sensitive blocking system. The stronger spring 53 is, the stronger must be the jerk and the belt to initiate a blocking.

The inventive mechanism operates as follows:

Upon exceeding a certain threshold acceleration resulting from an accident (about 5 g), a crash sensor (not shown) produces a current in ignition cable 14. Fuse 13 ignites drive charge 10. The drive gas pressure building up bursts the wall of cartridge 61 where charge 10 is received, and the gases pass through bore 21 in hub 20 into expansion space 22 between rotary vane 18 and abutment 19. The gases are under high pressure and drive rotary vane 18, so that ring 17 is sent in rotary motion.

The two pawls 24,24' connected to ring 17 through studs 23,23' turn along, and so does the facing control disc 37 which is engaged with pawls 24,24' through guide slots 39,39' and guide pins 38,38'. However, control disc 37 is instantaneously braked, since lug 40 impinges on stop surface 43 of groove 42 in pull-off casing 8. This impact shears lug 40 off control disc 37, at the predetermined break point 41.

Even prior to this shearing off, pawls 24,24' are pivoted inwardly, since ring 17 continues rotating and guide slots 39,39' of control disc 37 control the motion of guide pins 38,38'. Consequently, teeth 25,25' of pawls 24,24' engage teeth 26 of notched wheel 27 which is firmly secured to reel shaft 2. This engagement, representing a positive clutch operation, is terminated about 10° after the start of the rotation. While vane 18 is rotating, the two pawls 46,46' loaded by springs 45,45' rattle over teeth 44 provided on cylinder 16 which is integral with ring 17.

The further rotation depends on the force which has been applied to the belt, thus on whether the belted person was attached tightly or loosely.

In the first case, the force rises strongly and rapidly. For example, already after an angle of rotation of about 180° the force produced by the drive gases evolved from charge 10 might come to equilibrium with the opposite force of the belt. Then, vane 18 and ring 18 will stop without completeing their rotation through the maximum possible angle.

In this position, pawls 46,46' engage teeth 44 on cylinder 16 which is integral with ring 17. Pawls 24,24' remain engaged with notch wheel 27 because they are designed to produce an inflecting moment.

The forces produced by the accident act through the following parts:

The belt, reel shaft 2, notched wheel 27, pawls 24,24', ring 17, cylinder 16, pawls 46,46' pull-off casing 8, housing 1 of the automatic belt winding mechanism, and finally the body of the vehicle.

In the other case, i.e. with a loose belt, the force in the belt increases slowly. Ring 17 will turn through the maximum angle, until vane 18 impinges on abutment 19. With a corresponding opposite force exerted by the belt, the same situation is obtained as described above. However, if at the instant vane 18 impinges on abutment 19, and ring 17 is stopped, the opposite force of the belt has not yet substantially increased, teeth 25,25' of stopped pawls 24, 24' are disengaged from teeth 26 of notched wheel 27, i.e. reel shaft 2 idles ahead and still more of the belt is wound up by momentum.

During the period of acceleration by the drive gases of charge 10, the rotating parts (reel shaft 2, notched wheel 27, reel 3, and the belt roll) take up kinetic energy. Since teeth 25,25' of pawls 24,24' and teeth 26 of notched wheel 27 have the shape of sawteeth, reel shaft 2 can continue to turn, due to the taken up kinetic energy, until the force resulting from the inertia is in equilibrium with the opposite force of the belt. At the instant the belt retraction reverses into a belt extension, the two pawls 46,46' engage teeth 44 of cylinder 16 which is integral with ring 17.

Due to the complete revolution of vane 18, the head portions 62,62' of pawls 24,24' come into a position opposite the teeth of pawls 46,46' by which pawls 24,24' are also pushed into engagement with teeth 26 of notched wheel 27. The belt-sensitive blocking mechanism (52,54,60) provides a double safety by causing pawls 24,24' to engage teeth 26 of notched wheel 27.

The regular blocking of automatic belt winding mechanism upon exceeding a predetermined threshold of acceleration is initiated, in response to a deceleration of the vehicle (up to 0.4 g), through sensor ball 31 or, in response to the tension of the belt, at 1.0 to 1.5 g, through inertia disc 52. In the vehicle-sensitive blocking, upon a displacement of ball 31 and by means of lever 33, tooth 35 of pin 34 is engaged with teeth 26 of notched wheel 27. If now, the belt user, upon a vehicle deceleration, is hurled forward, the extending belt sets reel shaft 2 in rotation. Pin 34, which is engaged with teeth 26 of notched wheel 27, is taken along and (by an amount permitted by a slot in case 8 through which pin 34 extends), in turn takes along a control disc 37, through guide 47 thereof. With the rotation of control disc 37, pawls 24,24' are pivoted inwardly, due to guide slots 39, 39' of control dssc 37, engaging with guide pins 38, 38' projecting from pawls 24,24'. Teeth 25,25' of pawls 24, 24' then engage teeth 26 of notched wheel 27. A positive blocking taking up the load is thereby established.

The belt-sensitive blocking is initiated if a jerky pull (greater than 1.0 g) is exerted on the belt.

Due to its mass, inertia disc 52 remains during this jerky pull, and against the force of spring 53, in its position. Since reel shaft 2, and thus also capsule 36 and pivot pin 56, continues to turn, lever 54 is pivoted by slot 58 and guide pin 57 of inertia disc 52 projecting therein, pushed into engagement with internal teeth 60 of control disc 37, and applies against stop surface 59. Control disc 37 is taken along, whereby, as described above, teeth 25,25' of pawls 24,24' are brought into engagement with teeth 26 of notched wheel 27.

Figure 4:
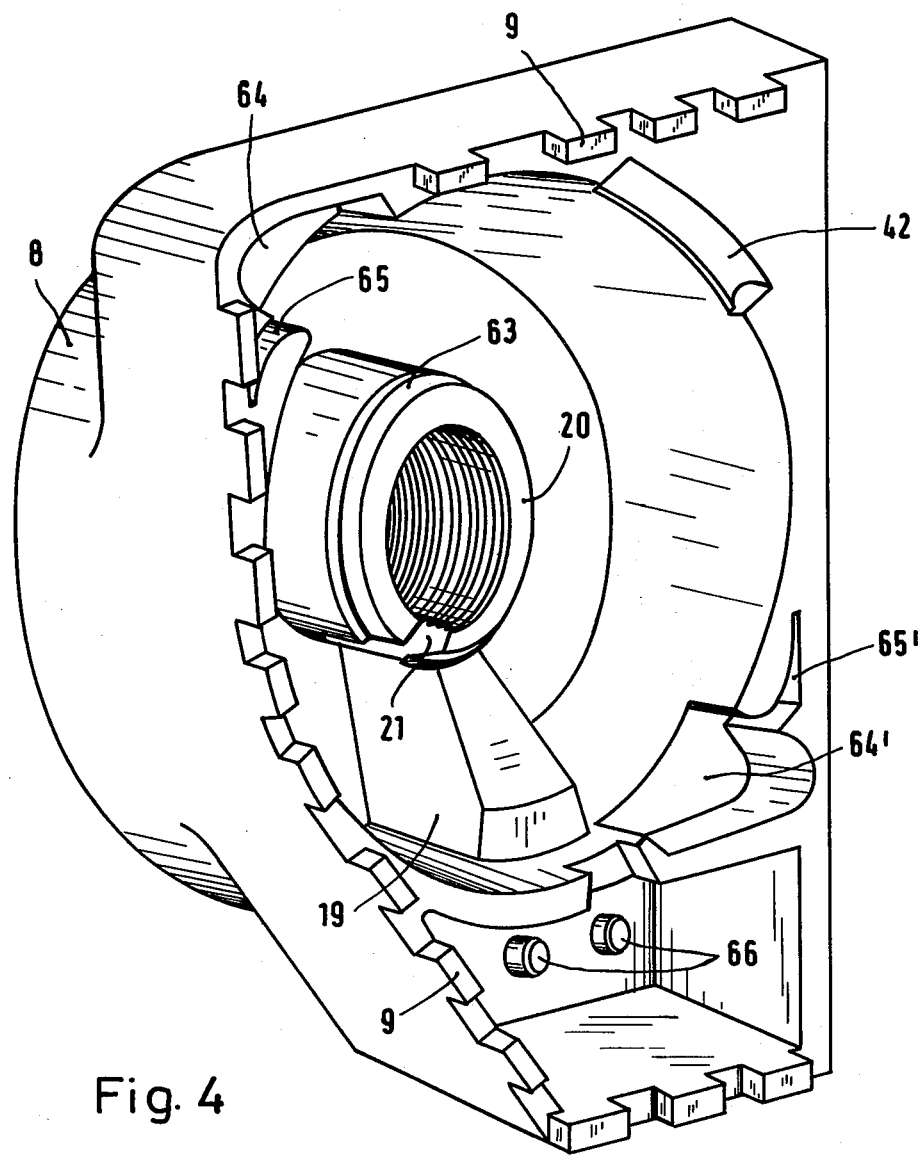
FIGS. 4 to 6 are perspective views showing how the parts in the pull-off casing are successively assembled.
Figure 5:
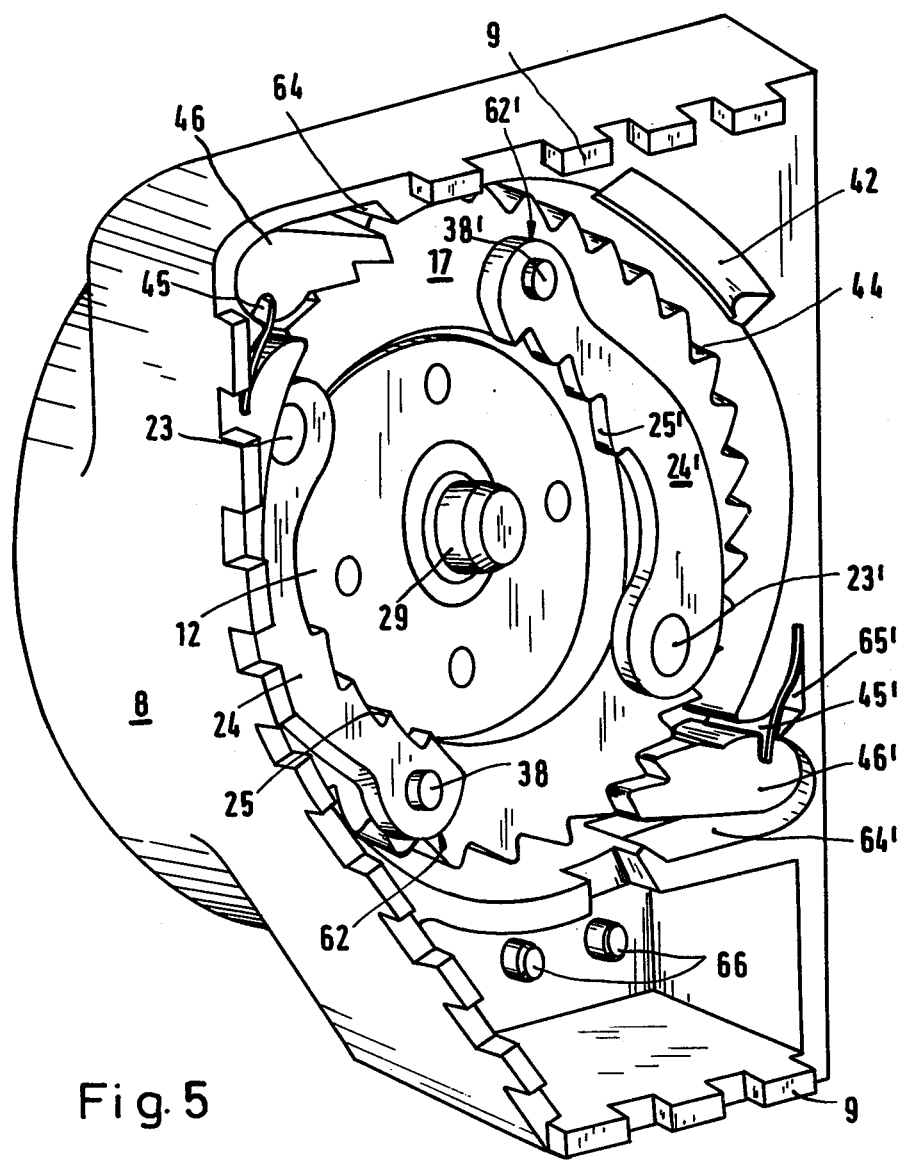
Figure 6:
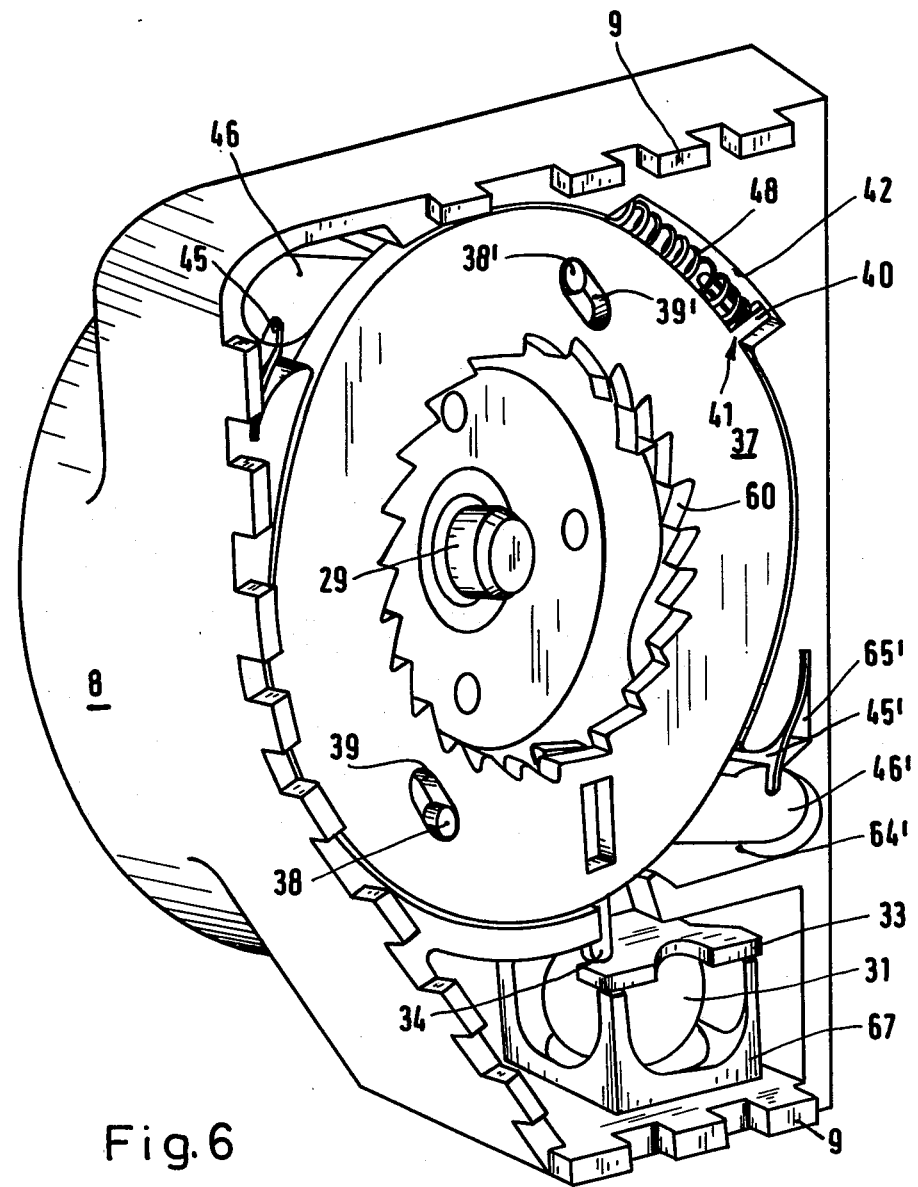

FIGS. 4 to 6 illustrate the assemblage of the parts accommodated in pull-off casing 8.

Pull-off casing 8 is shown in FIG. 4. It comprises the hollow hub 20 into which charge 10 is placed and around which annular space 15 for vane 18 extends.

A collar 63 of hub 20 serves to support the bearing of ring 17. Further provided in casing 8 are backrests 64,64' for pawls 46,46', recesses 65,65' for springs 45,45', and groove 42 for lug 40 and spring 48. In the lower part, fixing pins 66 are provided ensuring an accurate positioning of the casing 67 of the sensor for the vehicle-sensitive blocking. Connecting claws 9 are to connect casing 8 positively to leg 7 of the housing for the automatic belt winding mechanism, in order to transmit forces and torques. Casing 8 is secured against attachment by providing some longer connecting claws 9' and fitting them by stamping to leg 7 of the housing. The rotary casing comprisng cylinder 16 and ring 17 is placed in annular space 15. In the zone of bore 21, vane 18 comes into contact with abutment 19.

FIG. 5 shows the rotary casing, thus cylinder 16 and ring 17, inserted in annular space 15 and positioned by means of screw plug 12. Also in place are pawls 24,24' mounted on studs 23, 23' and pawls 46, 46' with springs 45,45', accommodated at backrests 64, 64' and in recesses 65,65'.

FIG. 6 shows a further phase of assemblage, with control disc 37, pin 34, spring 48, and the deceleration sensor comprising sensor ball 31, sensor casing 67, and sensor lever 33. In this stage, the parts with casing 8 form a preassembled unit which can be produced and stored as such, independently of the automatic belt winding mechanism.

Figure 7:
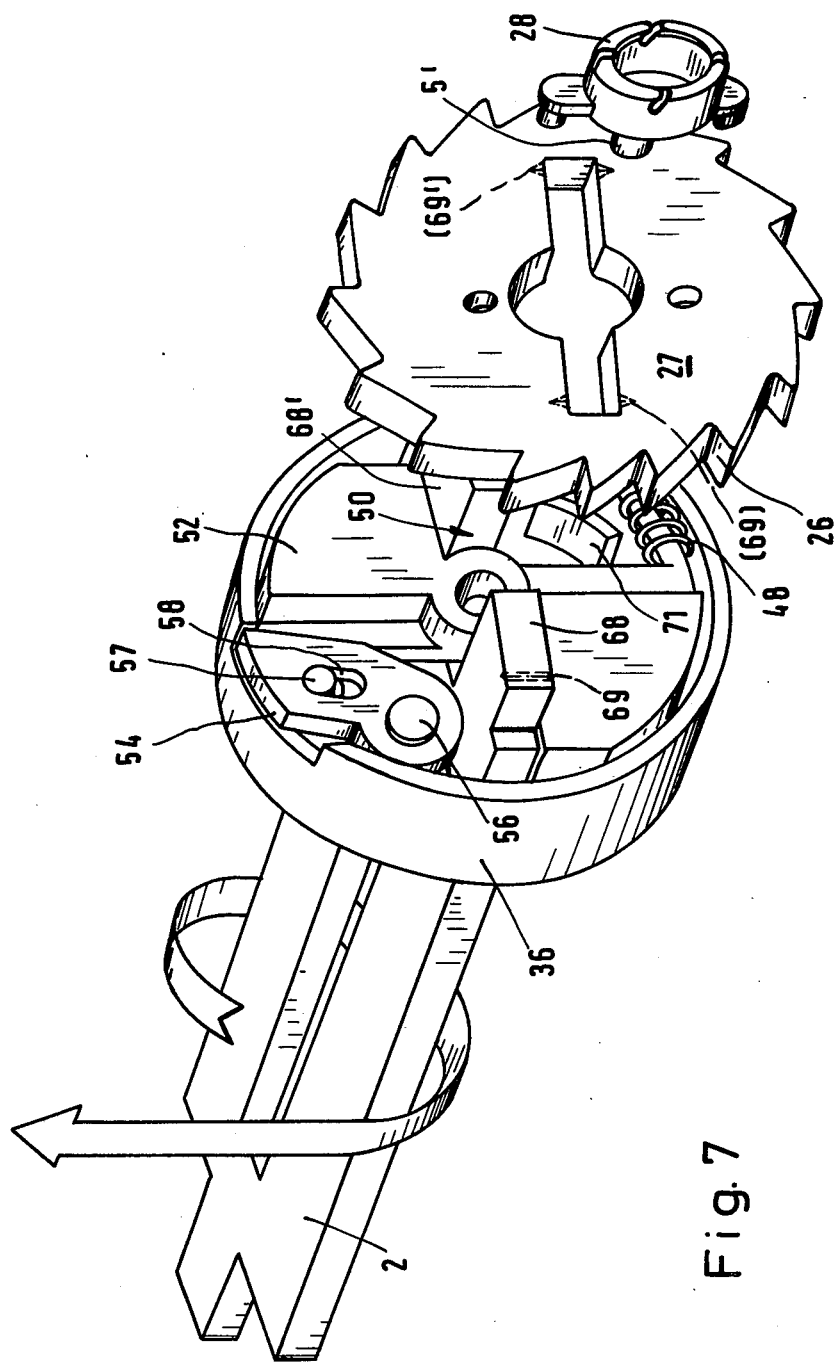
FIG. 7 is an exploded perspective view showing the parts of the reel shaft assembly.

FIG. 7 shows the belt winding mechanism as an also preassembled unit comprising reel shaft 2 and the belt-sensitive blocking device accommodated in capsule 36 and described above. The exploded view of FIG. 7 makes the relatively simple assemblage evident.

Upon fitting notched wheel 27 onto projections 68.68' of reel shaft 2, the wheel 27 and projection 68,68' are secured by stamping at two locations 69,69'.

Figure 8:
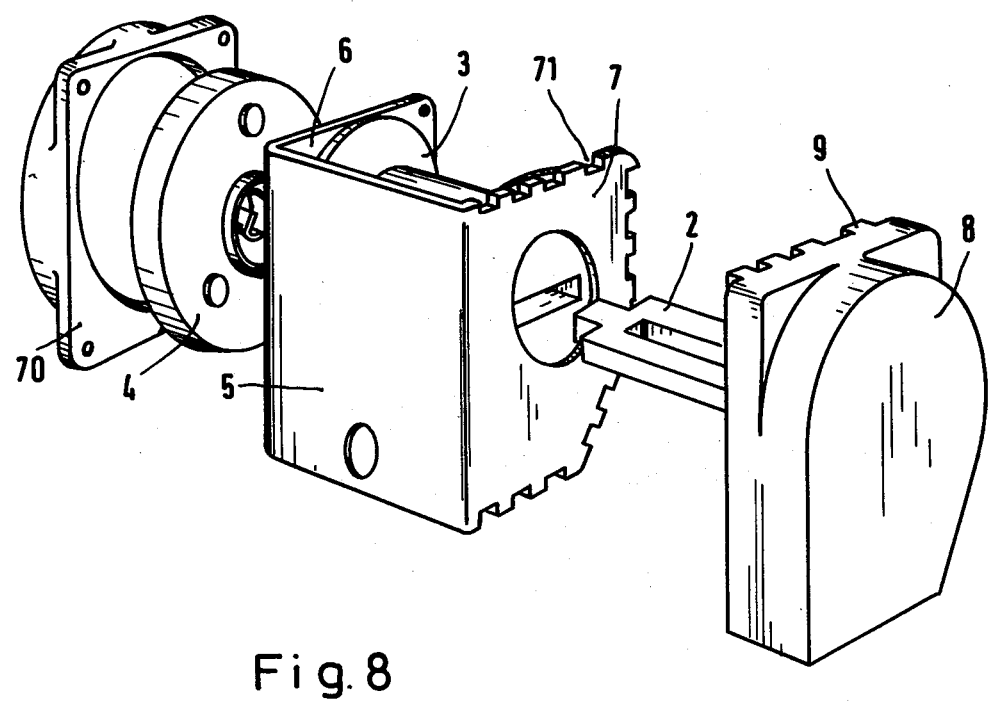
FIG. 8 is a similar view showing the entire take-up mechanism.

As shown in FIG. 8, finally, the take-up mechanism is assembled of substantially three preassembled units, namely that preassembled in pull-off casing 8, the reel shaft unit, with reel shaft 2 also shown, and the housing of the automatic belt winding mechanism, which is already contemplated with cover 70 and casing 4 for the winding spring. Connecting claws 9 are clearly shown on pull-off casing 8, engaging claws 71 of leg 7 of the housing for the automatic belt winding mechanism.

While a specific embodiment of the invention has been shown and described in detail to illustrate the application of the principles of the invention, it will be understood that the invention may be embodied otherwise without departing from such principles.

What is claimed is:

1. A take-up mechanism for a safety belt of a vehicle, comprising:
   a housing;
   a belt reel having a co-rotating reel shaft rotatably mounted to said housing in a belt take-up direction and an opposite belt extension direction;
   automatic belt winding means operatively connected to said reel for urging said reel to rotate in said take-up direction;
   a notched wheel co-rotatably connected to said reel shaft;
   a rotary piston motor with an abutment connected to said housing, a rotary vane rotatably mounted to said housing in said take-up direction and defining a chamber with said abutment, and gas pressure means for pressurizing the chamber to rotate said rotary vane upon activation of said gas pressure means by the occurrence of an abrupt vehicle motion;
   a ring co-rotably connected to said rotary vane;
   vehicle sensitive blocking means including a stop element movable to engage said notched wheel and stop rotation of said shaft in said belt extension direction upon the occurrence of an abrupt vehicle motion;
   a control disc rotatably mounted to said housing and rotatable upon at least one of the occurrence of an abrupt vehicle motion and an abrupt motion of said reel shaft in said extension direction;
   at least one blocking element movably mounted to said ring and operatively engaged with said control disc for engagement with said notched wheel upon rotation of said control disc so that an abrupt vehicle motion which activates said gas pressure means causes engagement of said ring to said notched wheel over said at least one blocking element to rotate said notched wheel and connected reel shaft in said take-up direction; and
   locking means engaged between said housing and said ring for preventing rotation of said ring in said extension direction.

2. A take-up mechanism according to claim 1, including an additional blocking element, said at least one and additional blocking elements movably connected to said ring at diametrically opposed locations thereon.

3. A take-up mechanism according to claim 1, wherein said at least one blocking element comprises a toothed pawl for engaging said notched wheel.

4. A take-up mechanism according to claim 3, wherein said control disc includes at least one guide slot extending obliquely with respect to a radial direction thereon and having a leading end in said take-up direction which is radially outwardly of a trailing end thereof, said at least one blocking element having a guide pin extending into said guide slot, said pawl forming said blocking element having a pawl end with teeth and pivotally mounted to said ring at a pivot axis remote from said pawl end.

5. A take-up mechanism according to claim 1, wherein said control disc includes a lug having a rated breaking area which breaks upon the stressing of said load by a selected amount, said housing having a fixed stop formed thereon against which said lug is engageable with rotation of said control disc.

6. A take-up mechanism according to claim 1, wherein said locking means comprise teeth formed on said ring and at least one pawl rotatably mounted to said housing and engaged with said teeth, a spring connected between said pawl and said housing for biasing said pawl toward said ring and said teeth of said ring shaped to permit rotation of said ring in said take-up direction but not in said extention direction.

7. A take-up mechanism according to claim 3, wherein said pawl includes teeth, said notched wheel including teeth engageable by teeth of said pawl, said notched wheel and pawl teeth shaped so that with said ring stopped, rotation of said reel shaft and said co-rotationally connected toothed wheel in said take-up direction disengages said pawl from said notched wheel.

8. A take-up mechanism according to claim 6, wherein said at least one blocking element has a pawl end engageable with said notched wheel, said blocking element pivotally mounted to said ring about a pivot axis remote from said pawl end, said pawl end positioned to engage said pawl which forms said locking means to be held by said pawl into engagement with said notched wheel upon rotation of said ring in said take-up direction.

9. A take-up mechanism according to claim 1, wherein said stop element of said vehicle sensitive blocking means comprises a pin, said control disc having a guideway therein for guiding movement of said pin toward and away from said notched wheel, and biasing means biasing said control disc in said take-up direction whereby movement of said pin forming said stop element into engagement with said notched wheel causes rotation of said control disc against said biasing means.

10. A take-up mechanism according to claim 9, wherein said vehicle sensitive blocking means comprises a cage including an inclined plane, a ball rollably mounted in said cage on said inclined plane and a lifting lever engaged over said ball and engaged with said pin for lifting said pin with movement of said ball up said inclined plane caused by abrupt vehicle motion.

11. A take-up mechanism according to claim 9, wherein said biasing means includes a lug formed on said control disc, a stop formed in said housing against which said lug extends and a spring engaged between said lug and said control housing on a side of said lug opposite said stop.

12. A take-up mechanism according to claim 1, including belt blocking means for blocking rotation of said reel shaft in said extension direction upon abrupt motion of said reel shaft in said extension direction, comprising said control disc including internal teeth, an inertia mass pivotally mounted to said reel shaft, a detent lever pivotally mounted to said reel shaft and engaged with said inertia mass, said detent lever movable into engagement with said internal teeth of said control disc upon relative motion between said inertia mass and said reel shaft caused by abrupt movement in said extension direction by said reel shaft.

13. A take-up mechanism according to claim 12, wherein said inertia mass includes a guide pin, said detent lever having a guide slot for receiving said guide pin so that relative rotation between said shaft and said inertia mass rotates said detent lever into engagement with said internal teeth of said control disc, and means on said shaft for forming a stop surface against which said detent lever engages when said detent lever is in engagement with said internal teeth.

14. A take-up mechanism according to claim 12, including biasing means connected between said inertia mass and said reel shaft for biasing said inertia mass in co-rotation with said shaft in said extension direction.

15. A take-up mechanism according to claim 12, including a capsule enclosing said inertia mass and said detent lever, said capsule co-rotationally connected to said reel shaft.

16. A take-up mechanism according to claim 15, wherein said capsule is disposed in said housing in a recess of said reel shaft, said gas pressure means comprising a pyrotechnic charge, said rotary piston motor including a plug for receiving said charge, a pin extending from said plug toward said recess in said reel shaft, a sleeve mounted on said pin, said reel shaft mounted for rotation on said sleeve and said sleeve including a second pin for rotatably receiving said inertia mass.

17. A take-up mechanism according to claim 1, wherein said housing comprises a pair of spaced plate-shaped legs and a back-plate connected to said plate-shaped legs enclosing said automatic belt winding means, a take-up casing enclosing an annular space for receiving said rotary piston motor, said abutment formed on said pull-off casing which abutment defines the chamber with said rotary vane, said casing including a hollow hub for receiving said gas pressure means which comprises a pyrotechnic drive charge, a groove defined in said casing, a biasing spring engaged between said control disc and said casing, in said groove for biasing said control disc in said take-up direction, said locking means comprising a pawl and teeth formed on said ring engaged by said pawl, and a spring biasing said pawl into engagement with said teeth, said casing including a backrest for receiving said pawl and defining a space for receiving said vehicle sensitive blocking means, said pull-off casing connected to one of said two plate-shaped legs.

18. A take-up mechanism according to claim 17, wherein said casing includes a plurality of connecting claws and said one plate-shaped leg to which said casing is connected includes a plurality of connecting claws engaged with a plurality of connecting claws of said casing.

* * * * *